United States Patent [19]
Fountain et al.

[11] 4,019,156
[45] Apr. 19, 1977

[54] ACTIVE/PASSIVE MODE-LOCKED LASER OSCILLATOR

[75] Inventors: William D. Fountain, Fremont; Bertram C. Johnson, Palo Alto, both of Calif.

[73] Assignee: The United States of America as represented by the United States Energy Research and Development Administration, Washington, D.C.

[22] Filed: Dec. 2, 1975

[21] Appl. No.: 636,864

[52] U.S. Cl. .................... 331/94.5 ML; 331/94.5 Q
[51] Int. Cl.$^2$ ........................................ H01S 3/098
[58] Field of Search ................................. 331/94.5

[56] References Cited

UNITED STATES PATENTS

| | | | |
|---|---|---|---|
| 3,423,695 | 1/1969 | Boyden | 331/94.5 Q |
| 3,500,241 | 3/1970 | Bjorkholm | 331/94.5 Q |
| 3,521,069 | 7/1970 | DeMaria et al. | 331/94.5 Q |
| 3,628,173 | 12/1971 | Danielmeyer | 331/94.5 C |

*Primary Examiner*—William L. Sikes
*Attorney, Agent, or Firm*—Dean E. Carlson; Roger S. Gaither; L. E. Carnahan

[57] ABSTRACT

A Q-switched/mode-locked Nd:YAG laser oscillator employing simultaneous active (electro-optic) and passive (saturable absorber) loss modulation within the optical cavity is described. This "dual modulation" oscillator can produce transform-limited pulses of duration ranging from about 30 psec to about 5 nsec with greatly improved stability compared to other mode-locked systems. The pulses produced by this system lack intrapulse frequency or amplitude modulation, and hence are ideally suited for amplification to high energies and for other applications where well-defined pulses are required. Also, the pulses of this system have excellent interpulse characteristics, wherein the optical noise between the individual pulses of the pulse train has a power level well below the power of the peak pulse of the train.

3 Claims, 1 Drawing Figure

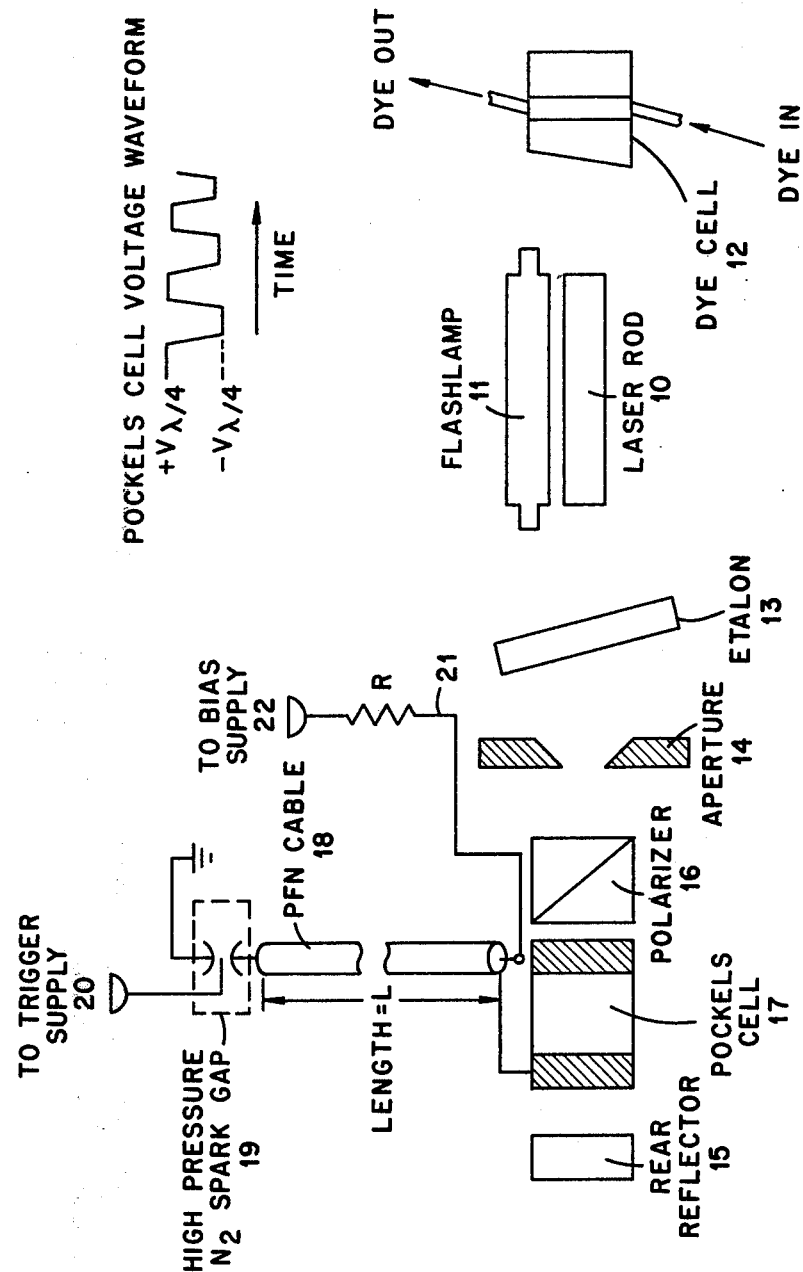

ACTIVE/PASSIVE MODE-LOCKED LASER OSCILLATOR

BACKGROUND OF THE INVENTION

The invention described herein was made in the course of, or under, Contract No. W-7405-ENG-48 with the United States Energy Research and Development Administration.

This invention relates to Q-switched/mode-locked laser oscillators, and more particularly, to such an oscillator employing simultaneous active and passive loss modulation within the optical cavity.

Q-switched and Q-switched/mode-locked laser oscillators are known in the art as exemplified by U.S. Pat. No. 3,815,046 issued June 4, 1974 to B. C. Johnson et al, and U.S. Pat. No. 3,818,373 issued June 18, 1974 to M. K. Chun et al, which utilize a lasing medium such as a neodymium:YAG rod, pumped by a flash lamp, for example, positioned in an optical cavity along with a linear polarizer and an electro-optical (active loss modulation) light polarizing element such as a Pockels cell with a biasing voltage network associated with the Pockels cell for altering the light polarization.

Most present-day flash-pumped mode-locked oscillators utilize a saturable absorber (passive loss modulation) for Q-switching and mode locking. Such passively-mode-locked oscillators have been brought to a high level of development, but they suffer inherent statistical variations in various output parameters. Another major problem with passive oscillators is failure to mode-lock; i.e., no output pulse generated. This occurs because in order to reduce the probability for generating unnecessary and unwanted secondary pulses, one must reduce the gain of the oscillator until it is operating close to threshold. Since the transmission properties of the saturable absorber are statistical in nature, operating close to threshold means an increased probability of the gain not exceeding the loss of the system, and resultant failure to generate an output pulse. Synchronously driven active modulation has been tried as a replacement for the bleachable dye (passive) approach, but has not succeeded in producing pulse durations under about 250 psec. Thus, a need exists for a Q-switched/mode-locked oscillator capable of achieving pulse durations ranging from $\leq 30$ psec to $\geq$ several nsec.

SUMMARY OF THE INVENTION

The present invention is a Q-switched/mode locked laser oscillator which utilizes a "dual modulation" approach which has the capability of producing transform-limited pulses of duration ranging from about 25 psec to about 5 nsec. This "dual-modulation" approach, employing simultaneous active (electro-optic) and passive (saturable absorber) loss modulation within the optical cavity, provides the short pulses achievable with dyes, while retaining the stability, reliability, and reproducibility associated with the synchronously driven units. The pulses produced by this oscillator have excellent interpulse characteristics and lack intrapulse frequency or amplitude modulation and thus are ideally suited for amplification to high energies and for other applications requiring well-defined pulses. In the dual-modulation oscillator (DMO) of this invention, the Q-switching is not controlled by the dye (it is controlled by the active modulator), and because of the reduced probability of generating secondary pulses, the DMO can be operated at sufficiently high gain to insure 100% probability of generating an output pulse (i.e., $g_{net} > 1$). These two features: (1) greatly reduced probability for generating unwanted secondary pulses, and (2) virtually zero probability of failure to mode-lock provide significant advantages over passive mode-locked oscillator systems.

Therefore, it is an object of this invention to provide a Q-switched/mode-locked laser oscillator capable of producing transform-limited pulses of duration ranging from < 30 psec to >5 nsec.

A further object of the invention is to provide an active/passive mode-locked laser oscillator.

Another object of the invention is to provide a Q-switched/mode-locked laser oscillator employing simultaneous active and passive loss modulation within the optical cavity.

Another object of the invention is to provide a Q-switched/mode-locked "dual modulation" laser oscillator for producing pulses which have excellent interpulse characteristics, and which lack intrapulse frequency or amplitude modulation suitable for amplification to high energies or other applications requiring stable well-defined pulses.

Another object of the invention is to provide an active/passive mode-locked laser oscillator that provides the short pulses achievable with the passively mode-locked laser oscillator while retaining the stability, reliability, and reproducibility associated with synchronously driven laser oscillator systems.

Other objects of the invention will become readily apparent from the following description and accompanying drawing.

BRIEF DESCRIPTION OF THE DRAWING

The single FIGURE schematically illustrates the active/passive (dual modulation) laser oscillator of the invention.

DESCRIPTION OF THE INVENTION

The invention is a Q-switched/mode-locked laser oscillator employing simultaneous active and passive loss modulation within the optical cavity, thereby producing transform-limited pulses of duration ranging from <30 psec to < 5 nsec. The pulses produced by this "dual modulation" oscillator have excellent interpulse characteristics and lack intrapulse frequency or amplitude modulation, and hence are ideally suited for amplification to high energies or for other applications where well-defined pulses are required. The simultaneous active and passive loss modulation is accomplished by utilizing electro-optic and saturable absorber means, respectively, within the optical cavity. The active/passive or "dual modulation" approach provides the short pulses achievable with dyes, while retaining the stability, reliability, and reproducibility associated with the synchronously driven units.

It has been shown that at the end of the nonlinear phase of pulse formation in an oscillator with passive mode locking (only), the probability for having two pulses in the resonator, that have an intensity ratio between $D (O \leq D \leq 1)$ and unity, is given by $$W(D) = \left(\frac{1}{2}\right) \exp\{[(1 - D\overline{\Delta})\ln m] - 1\} \tag{1}$$

where $m$ is the number of oscillating axial modes at the end of the linear phase of pulse formation and also the average number of noise pulses (maxima) in the resonator, where $\ln m$ is the natural logarithm of the number of oscillating axial modes, and $$\bar{\Delta} = 2(\bar{\alpha} - \gamma - k_o)/k_o \qquad (82)$$

where $\bar{\alpha}$ = average gain coefficient during the linear phase of pulse formation, $\gamma$ = linear feedback coefficient, and $k_o$ = initial absorption coefficient of the saturable absorber. In this case $m \sim 2t_L \Delta\nu$, where $t_L$ is the single-pass transit time for the resonator and $\Delta\nu$ is the spectral width of oscillation.

For the active/passive approach of this invention, there need be concern only with the probability for having two pulses in the resonator within the temporal "window" of the active modulator. As a first approximation assuming that the window is rectangular with duration $t_w$, then in Eq. (1) W is replaced with $W^1$ and $m$ with $m^1$, where $m^1 \sim t_w \Delta\nu$. For small $W^1$ (the only case of practical interest) and small W, $$W^1(D)/W(D) \approx \ln m^1/\ln m \approx \ln (t_w\Delta\nu)/\ln (2t_L \Delta\nu) \qquad (3)$$

For $\Delta t = 100$ psec, $t_w \sim 400$ psec, $2t_L \sim 10$ nsec, and transform-limited spectral bandwith, $t_w\Delta\nu \sim 4\Delta t\Delta\nu = (8/\pi) \ln 2 \approx 1.77$ and $2t_L\Delta\nu \sim 44.13$, so that $W^1(D)/W(D) \sim 0.15$; the improvement is even more dramatic, of course when $W(D)$ is not small.

In practice, it is desirable to operate with a value of $k_o$ for which $W^1(D)$ is acceptable (but $W(D)$ would not be) for operation near the Wagner-Lengyel stability point ($\lambda\alpha \approx 0.28$) without either component damage or "extra" pulses. This insures the greatest reproducibility of the pulse train envelope, and hence, of the amplitude and duration of the single switched-out pulse.

The "dual modulation" oscillator of this invention operates as a synchronously driven optical resonator. Intracavity spontaneous emission is gated symmetrically in time by a specially designed fast-switching Pockels cell that is utilized to provide first Q-switching and then 100% loss modulation in synchronism with the pulse round trip time in the cavity. A bleachable dye (for example, EK9740 in 1, 2 dichloroethane made by Eastman Kodak), of variable concentration provides a higher effective modulation depth (when required for shorter pulses than are possible using the Pockels cell only) and additional suppression of interpulse noise. Frequency selective elements and control of overall system gain (i.e., number of round trips) are combined to limit the spectral bandwidth of oscillation.

The drawing illustrates schematically an embodiment of the "dual modulation" oscillator system, with the Q-switch/loss modulator voltage waveform being shown in the inset, a detailed description being set forth hereinafter. This system is capable of producing transform-limited pulses, i.e., pulses completely devoid of amplitude or frequency modulation, over a wide range of pulse durations from <30 psec to >5 nsec. For longer pulses, the dye transmission is increased and the allowed spectral bandwith is decreased from the values appropriate to shorter pulses. For the longest pulses, no dye is used and the Pockels cell transmission risetime is deliberately degraded.

Referring now to the drawing, an embodiment of the oscillator system comprises a lasing medium 10 pumped by a flashlamp assembly 11, the lasing medium 10 and assembly 11 being located intermediate a flowing dye cell/output reflector assembly(saturable absorber) 12 and an etalon 13. For example the medium 10 and assembly 11 may constitute 6.4×76 mm double-Brewster, flashlamp-pumped Nd:YAG rod. Positioned adjacent etalon 13 and in axial alignment with medium 10 is an aperture forming member 14 with a rear reflector 15 positioned in spaced relation therewith, such that a Glan or linear polarizer 16 and a Pockels cell 17 are located therebetween, each being axially aligned with medium 10. Electrically connected to Pockels cell 17 is a pulse-forming network (PFN) cable 18 having a length L at one end of which is electrically connected a high pressure $N_2$ spark gap assembly 19 operatively connected to a trigger power supply as indicated by legend at 20. Electrically connected intermediate Pockels cell 17 and PFN cable 18 via lead 21 having a resistor R therein is a bias power supply as indicated at 22. Operation of the Pockels cell is known in the art, as exemplified by abovementioned U.S. Pat. No. 3,815,046 and need not be described in detail. However, the insert in the drawing illustrates the Pockels cell voltage waveform. Also, the operation of linear polarizer 16 is well known and description thereof is deemed unnecessary. Also, the invention is not limited to the specific type of lasing medium described, as other known lasing medium may be utilized.

The above-described active/passive oscillator system is capable of producing transform-limited pulses, i.e., pulses completely devoid of amplitude or frequency modulation, over a wide range of pulse durations from <30 psec to >5 nsec. This is accomplished by controlling the active (Pockels cell 17) and passive (flowing dye cell/output reflector assembly 12) loss modulation mechanisms with the optical cavity. For longer pulses, the dye transmission through assembly 12, via input and output means thereof as indicated by legend is increased and the allowed spectral bandwidth is decreased from the values appropriate to shorter pulses. For the longest pulses, no dye is used and the Pockels cell transmission risetime is deliberately degraded.

Besides the intrapulse characteristics described above, the DMO inherently has excellent interpulse characteristics, to wit: the optical noise between the individual pulses of the pulse train has a power level that is typically >43dB below the power of the peak pulse of the train. Also, it is important to the operation of the device that the dye be located at one mirror and the Pockels cell (and polarizer) be as close as practical to the other mirror. However, it is not important which mirror is the output mirror, nor what the order of the other components (rod, etalon, aperture) is.

Tests conducted with the above-described oscillator system show a smooth, time symmetrical pulse, a smooth unmodulated trace on a 10 psec resolution streaking camera and a single, narrow spectral line, whereas data taken from a system with insufficient frequency selection imposed on the cavity show an asymmetrical pulse on the CRT trace, distinct amplitude modulation on the streak camera trace, and multimode spectral content for the pulse. These tests have confirmed the capability of the herein-described system for producing transform-limited pulses over the <30 psec to >5 nsec pulse duration range.

It has thus been shown that this invention provides a laser oscillator system that combines active and passive modulation techniques in a unique way, resulting in stable, reproducible transform-limited output pulses with adjustable time durations ranging from <30 psec to >5 nsec.

Although the above-described embodiment uses an electro-optical loss modulator, consisting of a Pockels cell and associated driving circuitry together with a polarizer, the active modulation element could consist of any form of active loss modulator (e.g., acousto-optic modulator) and the same principles would apply.

Again, it is pointed out that the DMO inherently possesses better interpulse characteristics, for typical operating parameters, and the probability of obtaining a secondary (or "satellite") pulse train is reduced by an order of magnitude or more when compared to a passively mode-locked laser at the equivalent operating point.

Accordingly, the above-described DMO of this invention produces significant advantages over the passively-mode-locked oscillator systems; namely (1) greatly reduced probability for generating unwanted secondary pulses, and (2) virtually zero probability of failure to mode-lock.

While a particular embodiment of the invention has been illustrated and described, modifications will become apparent to those skilled in the art, and it is intended to cover in the appended claims all such modifications as come within the spirit and scope of this invention.

What we claim is:

1. A Q-switched/mode-locked laser oscillator including an optical resonant cavity employing simultaneous active and passive loss modulation within the optical cavity comprising: a lasing medium positioned intermediate and in axial alignment with a rear reflector and a flowing dye cell/output reflector assembly, means for pumping said lasing medium positioned adjacent thereto, a Pockels cell and a linear polarizer positioned intermediate said lasing medium and said rear reflector and axially aligned therewith, means for controlling said Pockels cell operatively connected therewith, and an aperture forming member and an etalon positioned intermediate and aligned with said polarizer and said lasing medium.

2. The laser oscillator defined in claim 1, wherein the lasing medium comprises a Nd:YAG rod.

3. The laser oscillator defined in claim 1, wherein said pumping means comprises a flash lamp assembly.

* * * * *